3,110,729
METHOD OF MAKING CYCLO-BUTANE-1,2-DICARBOXAMIDE

Janice L. Greene, Warrensville Heights, and James D. Idol, Jr., Shaker Heights, Ohio, assignors to The Standard Oil Company, Cleveland, Ohio, a corporation of Ohio
No Drawing. Filed Aug. 3, 1962, Ser. No. 214,531
4 Claims. (Cl. 260—557)

This invention relates to a process of making cyclo-butane-1,2-dicarboxamide. The invention is especially concerned with a process of making the above compound using cyclo-butane-1,2-dicyanide as a starting material, and proceeding through the adduct thereof formed by reacting with the monohydrate of sulfuric acid as an intermediate.

Either the cis or trans forms of the cyclo-butane-1,2-dicyanide can be used as a starting material to form cis or trans dicarboxamide. The invention is also applicable to a mixture. The trans-cyclo-butane-1,2-dicyanide is the more readily available starting material and for this reason this form will be described in the preferred embodiment hereinafter.

The reaction in accordance with the process herein and the final product produced is shown in accordance with the following equation:

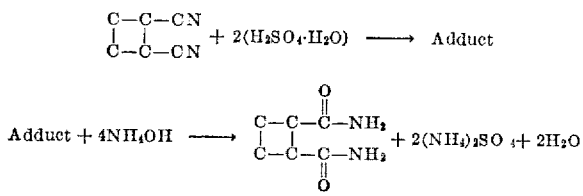

In making the intermediate adduct, the sulfuric acid monohydrate and the cyclo-butane-1,2-dicyanide are mixed together or one added to the other at a temperature of from 40° to 125° C. for from 15 minutes to four hours, followed by cooling or permitting the reaction product to come to ambient temperature. The higher the reaction time, and the lower the temperature, the longer the reaction time. The reaction is exothermic and external cooling may be used if desired. Temperatures of from 50° to 95° C. are preferred because higher temperatures may somewhat affect the stability of the cyclo-butane ring. The preferred reaction time in this temperature range is 1 to 2 hours.

The relative amounts of the reaction components can be theoretical although an excess of the acid monohydrate is not harmful and an excess of from 1 to 10% can be used, since the acid is neutralized in the subsequent step. The adduct and method of making it is described and claimed in application Serial No. 214,532, filed of even date herewith.

In accordance with the present invention, the adduct is converted to the corresponding dicarboxamide by reacting with sufficient base to neutralize the acid in the adduct and any excess of unreacted acid. A large excess of base is generally to be avoided because it is wasteful and it may induce isomerization. The concentration of the solution of the base is not critical. The adduct is simply poured into the base solution or vice versa, with stirring, and the dicarboxamide precipitates. The temperature is kept below 50° C. by external cooling, if necessary.

Ammonia is the preferred base because it gives the highest yields. Other bases are alkali metal hydroxides, carbonates, amines, lime, etc.

The following is the best mode contemplated for carrying out the invention:

Example I (a) In a 1-liter 3-necked flask equipped with stirrer, dropping funnel and thermometer is placed 245 g. concentrated sulfuric acid and 30 ml. water to give 275 g. (2.37 moles) sulfuric acid monohydrate. When the temperature of this mixture is between 50–70° C., 112 g. (1.055 moles) trans-1,2-dicyanocyclobutane is added at such a rate that the temperature of the reaction mixture can be maintained by cooling between 50–100° C. This is an exothermic reaction. If the temperature rises much above 100° C., considerable decomposition will occur; below 40° C. there will be little or no reaction. When all of the 1,2-dicyanocyclobutane has been added, the mixture is a colorless viscous syrup. After stirring for ½ hour at 50–70° C., the adduct formation is complete.

(b) The adduct is slowly poured with stirring into 450 g. of concentrated $NH_4OH$ (28–30% $NH_3$) contained in a 2-liter beaker cooled in an ice-bath. A white solid precipitates immediately. The temperature of this reaction medium is maintained between 20–40° C. by external cooling and more concentrated $NH_4OH$ is added from time to time to keep the pH of the reaction medium greater than 7. After stirring for ½ hour after addition of the adduct, the mixture is filtered to give 219 g. white solid. Recrystallization from 1200 ml. $H_2O$ gives 126 g. (84% yield) of trans-1,2-cyclobutane dicarboxamide, M.P. 232.5–233.0° C. Conversion is 100%.

It has the following analysis:

|  | Theoretical, percent | Actual, percent |
|---|---|---|
| Carbon | 50.7 | 50.6 |
| Hydrogen | 7.05 | 7.04 |
| Nitrogen | 19.7 | 19.0 |

Example II

Example I(a) is repeated. To the adduct was added a 25% solution of sodium hydroxide until neutralization was complete, during which time the temperature rose to a maximum of 78° C. At this point the mixture was a clear pale yellow liquid which slowly deposited white crystals over a period of 1½ hours. Filtration gave a 50.4% yield of trans-1,2-cyclobutanedicarboxamide of better than 90% purity as calculated by its infrared spectrum.

We claim:

1. The method of preparing cyclo-butane-1,2-dicarboxamide, which comprises the steps of reacting cyclo-butane-1,2-dicyanide with the monohydrate of sulphuric acid to form an adduct, said reaction being continued for from 15 minutes to four hours at a temperature of 40 to 125° C., cooling to ambient temperature, reacting said adduct with a base in solution, and recovering the precipitated dicarboxamide.

2. The method of preparing cyclo-butane-1,2-dicarboxamide, which comprises the step of reacting cyclo-butane-1,2-dicyanide with the monohydrate of sulphuric acid to form an adduct, said reaction being continued for from one to two hours at a temperature of 50 to 75° C., cooling to ambient temperature, reacting said adduct with ammonia in aqueous solution, and recovering the precipitated discarboxamide.

3. The method of preparing cyclo-butane-1,2,-dicarboxamide, which comprises the step of reacting cyclo-butane-1,2-dicyanide sulfuric acid monohydrate adduct with a base in an aqueous solution, and recovering the precipitated dicarboxamide.

4. The process of claim 3 in which the base is ammonia.

No references cited.

UNITED STATES PATENT OFFICE
CERTIFICATE OF CORRECTION

Patent No. 3,110,729            November 12, 1963

Janice L. Greene et al.

It is hereby certified that error appears in the above numbered patent requiring correction and that the said Letters Patent should read as corrected below.

Column 1, line 43, after "reaction" insert -- temperature, the shorter the reaction --.

Signed and sealed this 28th day of April 1964.

(SEAL)
Attest:

ERNEST W. SWIDER            EDWARD J. BRENNER

Attesting Officer            Commissioner of Patents